United States Patent [19]

Yanaru et al.

[11] Patent Number: 4,843,593
[45] Date of Patent: Jun. 27, 1989

[54] WORD PROCESSOR WITH DECORATIVE CHARACTER PRINTER

[75] Inventors: Hirofumi Yanaru, Ikoma; Hiroki Maruido, Tenri, both of Japan

[73] Assignee: Sharp Kabushiki Kaisha, Osaka, Japan

[21] Appl. No.: 898,620

[22] Filed: Aug. 21, 1986

[30] Foreign Application Priority Data

Aug. 23, 1985 [JP] Japan .................. 60-186309

[51] Int. Cl.⁴ .................. G06F 3/12; G09G 1/06
[52] U.S. Cl. .................. 364/900; 340/735
[58] Field of Search ... 364/200 MS File, 900 MS File, 364/519, 523; 340/729, 730, 735, 790; 400/121, 110

[56] References Cited

U.S. PATENT DOCUMENTS

| | | | |
|---|---|---|---|
| 3,781,849 | 12/1973 | Baron et al. | 340/730 |
| 4,050,563 | 9/1977 | Menhennett | 340/731 |
| 4,186,393 | 1/1980 | Leventer | 340/729 |
| 4,205,922 | 6/1980 | Pascoe | 364/900 X |
| 4,353,653 | 10/1982 | Zimmerman | 364/900 X |
| 4,408,198 | 10/1983 | Kudirka | 340/729 |
| 4,630,947 | 12/1986 | Yoshida et al. | 400/110 X |
| 4,712,102 | 12/1987 | Troupes et al. | 340/735 X |
| 4,715,006 | 12/1987 | Nagata | 364/523 |

Primary Examiner—Raulfe B. Zache
Assistant Examiner—Florin Munteanu
Attorney, Agent, or Firm—Birch, Stewart, Kolasch & Birch

[57] ABSTRACT

A word processor for setting print out format for each line of a document to be printed by a decorative character printer. The word processor can format data by using various format data bits. The decorative character printer uses decorative character font-identifying bits. The word processor has a device for selecting either a format data input mode or a word data input mode. The format data or word data can be input and stored in the word processor. It will then be determined whether the format data includes decorative character-related data at the head or tail of a line of word data. Decorative characters can then be developed if such data is present in a line of word data. If decorative characters are to be printed, they can be printed in stereoscopically decorated black characters, stereoscopically decorated white characters, white decorative characters and/or thick decorative characters such that lines of a document can be in different format while the document is continuously printed out by the word processor.

3 Claims, 7 Drawing Sheets

| Format Setting |
|---|
| Line feed pitch      XXmm |
| Quadruple character      Stereoscopic 1 (Standard, Stereoscopic 1, Stereoscopic 2, White, Thick black) |

WORD PROCESSOR WITH DECORATIVE CHARACTER PRINTER

BACKGROUND OF THE INVENTION

1. Field of the Invention

The present invention relates to a word processor, or more specifically to a decorative character printer for Japanese or English word processor which can select, easily set and print out decorative characters.

2. Description of the Background Art

With recent popularization of Japanese word processors, more diversified decorative character printouts have come to be demanded.

The conventional Japanese word processor can create documents with decorative characters by designating a decorative character mode.

Once a decorative character mode is designated, however, the same decorative character font is used over the entire document. Therefore, the conventional word processor cannot print out a document with different decorative character fonts for different lines.

SUMMARY OF THE INVENTION

In view of the foregoing, an object of the present invention is to provide a decorative character printer capable of changing decorative character fonts for each line.

Another object of the present invent is to provide a word processor having a decorative character printer capable of setting printout format by lines and which contains decorative character font-identifying bits in the format data comprising various format information bits, thereby facilitating selective and printout of various decorative character fonts.

Other objects and further scope of applicability of the present invention will become apparent from the detailed description given hereinafter. It should be understood, however, that the detailed description and specific examples, while indicating preferred embodiments of the invention, are given by way of illustration only and various changes and modifications within the spirit and scope of the invention will become apparent to those skilled in the art from this detailed description.

To achieve the above objects, a word processor of the present invention, capable of setting printout format for each line, has decorative character font-identifying bits in the format data comprising various format information bits.

Furthermore, a decorative character printer of the present invention, built into a word processor capable of setting the printout format for each line, prints out decorative characters of various types for different lines by changing the setting of decorative character font-identifying bits in the format-setting data.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DETAILED DESCRIPTION OF THE INVENTION

An embodiment of the present invention will be described with reference to the drawings.

Figure 1:
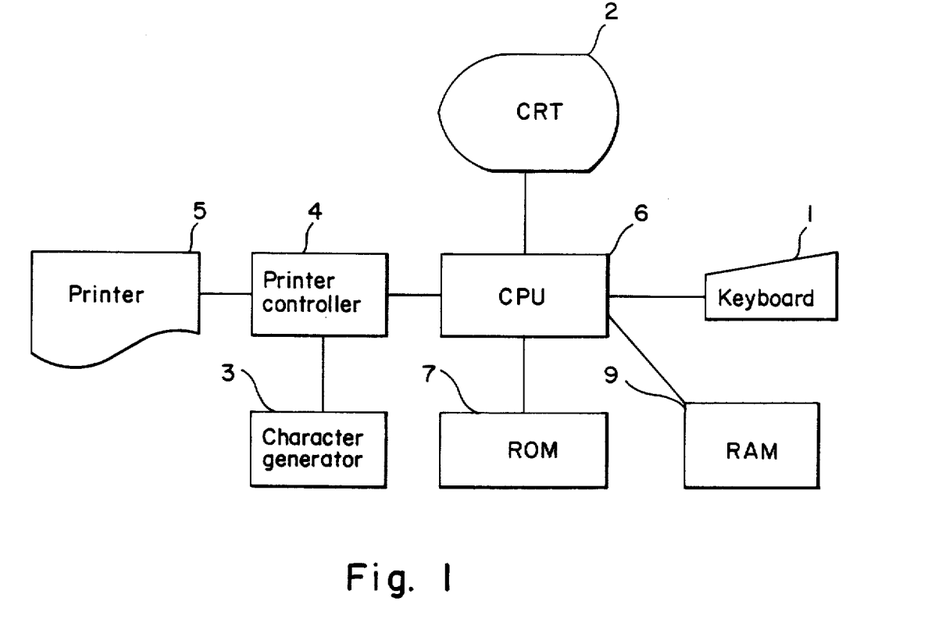
FIG. 1 is a block diagram showing the hardware construction of a decorative character printer of the present invention.

FIG. 1 is a block diagram showing the construction of a decorative character printer of the present invention.

Decorative character font indicative data are contained in the format data which are set from a keyboard 1. Word data and the format data thus input from the keyboard 1 are presented on a CRT 2. A printer 5 is operated via a character generator 3 and a printer controller 4 to print out characters as required. These operations are controlled by a CPU 6, a program for which is pretiminarily stored in an ROM 7. The CPU 6 controls each component according to the program stored in the ROM 7. The word data and format data input from the keyboard 1 are stored in a RAM 9. The word data is read out from the RAM 9 and printed out via the character generator 3 and the printer controller 4 on the printer 5, as controlled by the CPU 6.

Here, the decorative character printer refers to a word processor that can print out decorative characters. In the following description, therefore, the term "word processor" is used in place of a decorative character printer.

For the purpose of description, it is assumed that a word processor of an embodiment of the present invention can print out three types of character in size: standard, double or quadruple (standard < double < quadruple) it is also assumed that the word processor can print out decorative characters only in the quadruple mode. When the quadruple mode is set from the keyboard 1, decorative characters of the type designated in the format data can be printed out for each line. Some of the decorative character fonts are shown in FIG. 5: (a) stereoscopically decorated black characters, (b) stereoscopically decorated white characters, (c) white decorative characters, and (d) thick decorative characters.

Now, operation for inputting word data in the word processor and printing the data out with decorative characters for only a particular line will be described.

To input word data, the power switch of the word processor is turned on. At this time, a program and a dictionary data required for processing the word data may be stored in the RAM 9.

The format key on the keyboard 1 is depressed for setting the entire print out format suitable for the word data to be input. Then, the CRT 2 gives a picture for setting paper size (B5, A4, B4), number of characters on a line, line feed pitch, character size and font of decorative character.

Using this picture, desired format is set for registration by depressing numeric keys, alphabet keys and cursor keys. The format data thus, input is stored in the format data area of the RAM 9.

After the format setting (or after the format setting mode is released), word data is input from the keyboard 1. The word data thus input is edited according to the preset format.

To print out only a particular line with decorative characters, the formal setting is conducted as follows. Position the cursor to the head or end of the particular line on the CRT 2 and depress the format key to enter the format setting mode. Then, the CRT 2 displays the format setting picture: i.e. paper size, number of characters on a line, line feed pitch, character size and decorative character font that were set before inputting words data. Format setting for printing out only the particular line with decorative characters is achieved by changing necessary, parts of the format setting. Namely, set the character size for quadruple mode and designate the intended decorative character font. Then, store the modified format data in the format data area of the RAM 9. When format has been set for decorative character printing of a particular line, data is added to the head or tail of the particular line of the word data, indicating that the line is set for decorative character printing. Simultaneously, data is added to the format data, indicating which line of the word data is set for decorative character printing. (The position information for the particular line may be generated with reference to the line feed information.) Thus, when word data printing reaches the particular line, the CPU 6 recognizes the format setting data added to the head or tail of the line, reads the format data stored in the format data area: i.e. presence or absence of decorative character designation, etc., and allows the line to be printed out according to the corresponding format data.

The present invention is characterized in that decorative character can be designated when setting the format for a particular line of word data.

Figure 2:
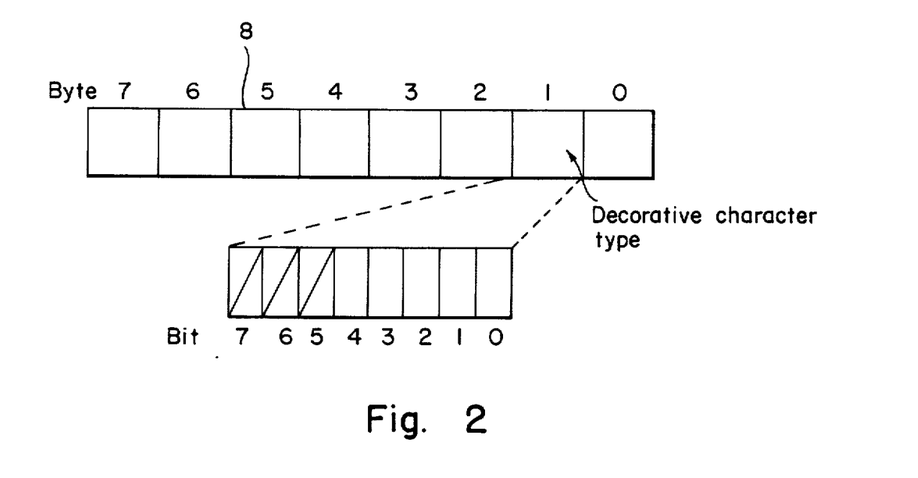
FIG. 2 is a schematic chart for explaining the data bits in the format data.

FIG. 2 shows a data packet 8 for setting format data. The packet 8 is composed of eight bytes, one of which is allocated for decorative character font information. The byte comprises eight bits, the lower five bits for identifying decorative character font and the remaining three bits retained for future possible expansion. The other seven bytes are used for information such as paper size, number of characters on a line, line feed pitch and character size. Among the five bits for decorative character font information, three are used for classification and the remaining two for sub-classification of the decorative character fonts. The decorative character font-identifying three bits are set to (000), (001), (010) and (011) for standard quadruple, stereoscopic, white and thick black characters, respectively. The two bits for sub-classification may be used, for example, for designating stereoscopic characters in black or white. Thus, it is possible to designate desired decorative character font for a particular line by punching keys on the key board 1 when changing the number of characters for the line, line feed pitch, etc. of the preset format data. That is, decorative characters can be designated by lines.

Figure 3:
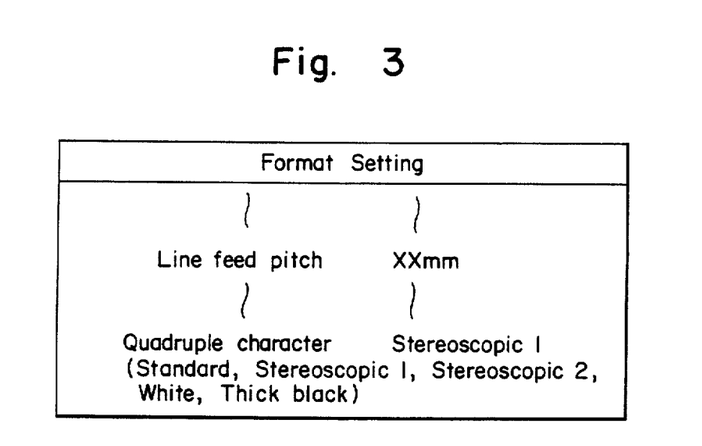
FIG. 3 is a front view of a CRT display presenting an example of format setting picture.

FIG. 3 shows an example of format setting picture including decorative character fonts on the CRT 2. In this example, any of (a) standard, (b) stereoscopic 1, (c) stereoscopic 2, (d) white and (e) thick black characters can be designated by the cursor as quadruple characters. The example shows that "stereoscopic 1" has been selected as the decorative character.

Figure 4:
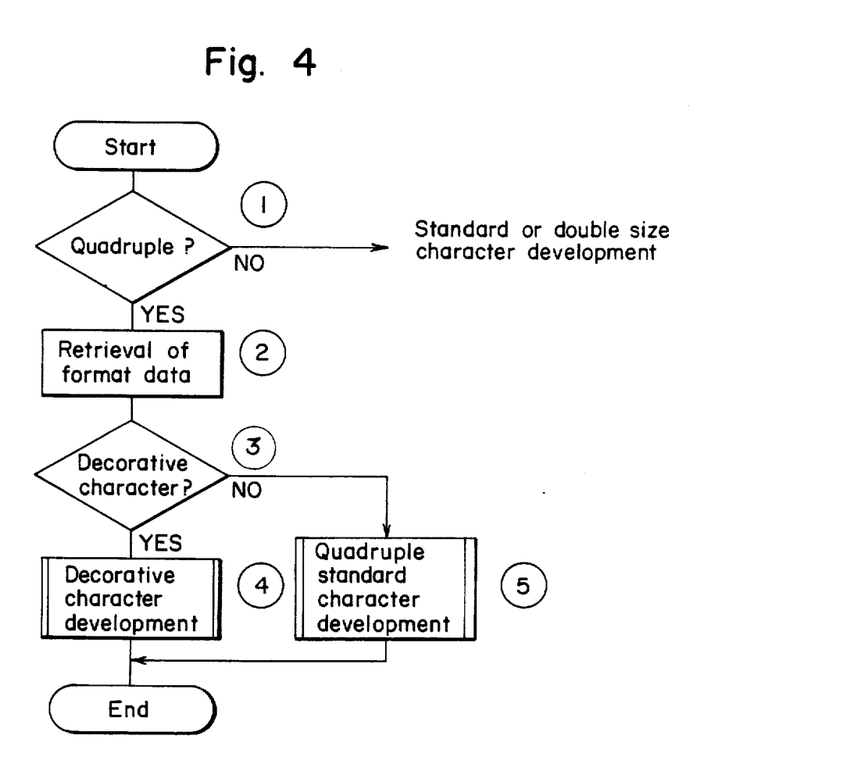
FIG. 4 is a flow chart for the procedure of generating decorative characters.
Figure 5A:
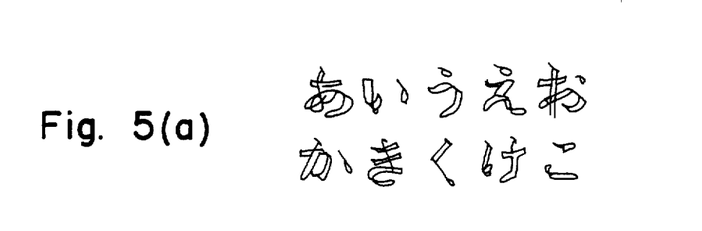
FIGS. 5(a) through 5(d) respectively show samples of decorative characters.
Figure 5B:
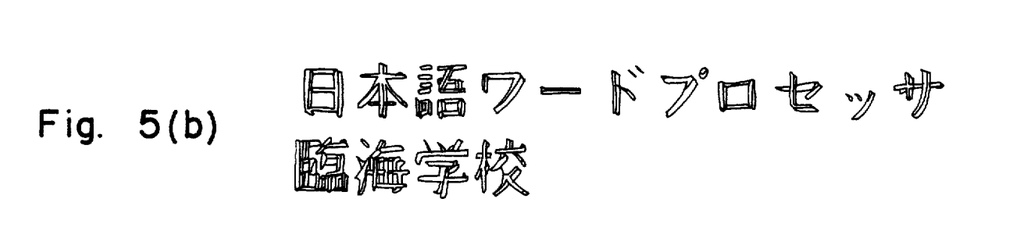
Figure 5C:
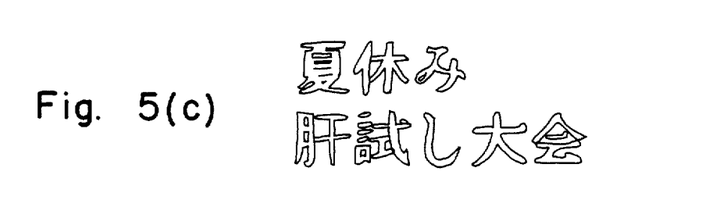
Figure 5D:
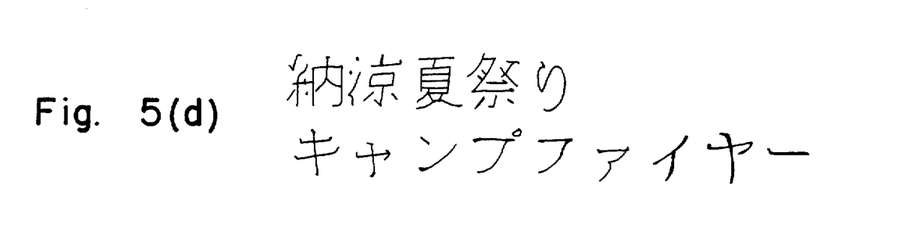

The process of developing the actual character image for printing from the word data will now be described referring to the flow chart of FIG. 4. After editing a line of word data, the character print image generation process is branched into the processes for decorative characters and for standard quadruple characters, either of the branch processes being followed according to the format data setting. The format data which is referred to at this stage is the same as that before setting quadruple mode.

At the step ①, the CPU 6 determines if the quadruple mode has been designated or not. If not, word data is processed for normal or double size character printing. If the quadruple mode has been designated, on the other hand, the program proceeds to the step ② where the format data is retrieved. At the step ③, the CPU 6 searches the three-bit portion of the character font-setting byte to see whether decorative or standard quadruple character is designated. If decorative character has been designated, the program proceeds to the step ④ to develop and print out the designated decorative characters. Meanwhile, if it is not determined in the step ③ that decorative character has been designated, then standard quadruple characters are printed out. Through these processes, it is possible to print out the word data with different kinds of decorative characters for different lines.

Now, the process of generating and printing stereoscopic characters is described, assuming that each character of the registered word data is formed with necessary dots selected from among multiple dots arranged in a matrix.

Figure 6:
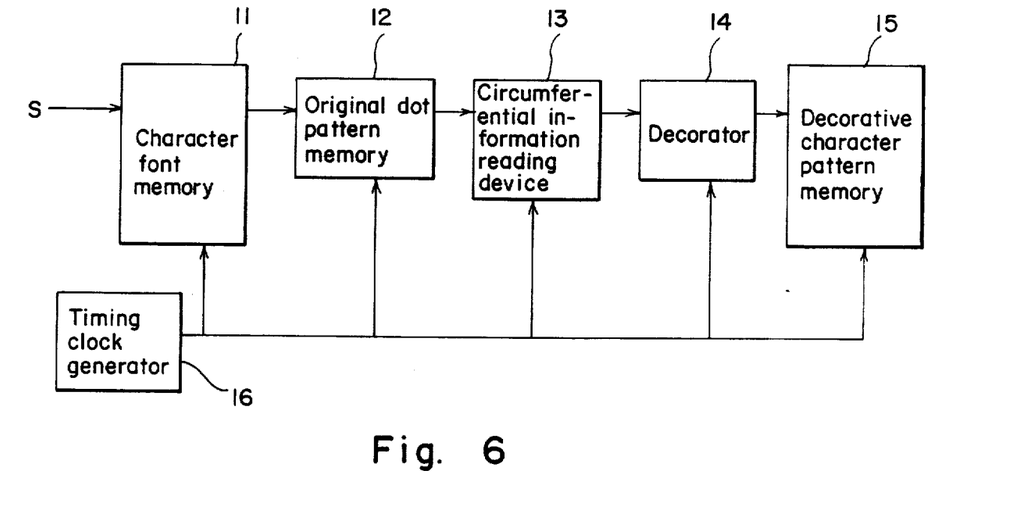
FIG. 6 is a block diagram showing the basic construction of a decorative character generator.

FIG. 6 shows the basic construction of the decorative character generator. A character font memory 11 stores dot matrix character font to be decorated. When a character-designating signal "S" is sent from the CPU 6 to the character font memory 11 to select a character font, the original dot pattern of the character font is temporarily stored in an original dot pattern memory 12. Here, the original dot pattern means the dot pattern of each character before being processed for decoration. A circumferential information reading device 13 determines if there are dots around each dot of the original dot pattern stored in the original dot pattern memory 12. Based on the information output from the circumferential information reading device 13, a decorator 14 arranges a dot in a decorative character pattern memory 15 at the proper position for decoration. Decoration is thus conducted dot by dot. A timing pulse generator 16 supplies timing signals to each of the above components.

Figure 7:
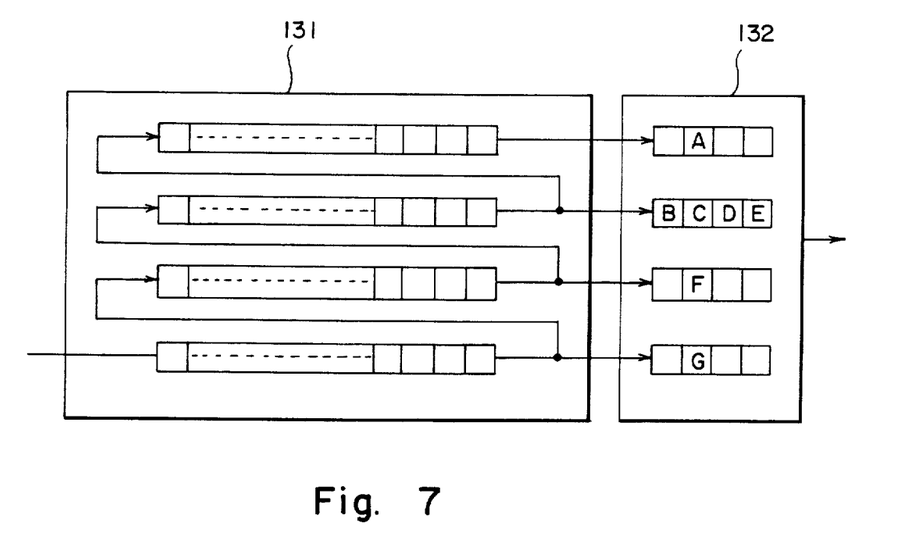
FIG. 7 is a block diagram showing the construction of a circumferential information reading device.

FIG. 7 show the construction of the circumferential information reading device 13 which comprises a shift register 131 for storing four lines of an original dot pattern and four serial in-parallel out 4-bit shift registers 132. Original dot pattern is sequentially input from the original dot pattern memory 12 to the shift register 131. When bit data corresponding to the concerned dot of the original dot pattern comes at the position "C" of the shift registers 132, the state of the bits "A" through "G" coincides with the dot state around the concerned dot of the original dot pattern. In this way, the circumferential information reading device 13 identifies the condition around the concerned dot.

Procedure for stereoscopic character decoration is described below to explain the embodiment of the invention. Through the stereoscopic decoration process, the stereoscopic character pattern shown in FIG. 9 is obtained from the pattern shown in FIG. 8.

Figure 8:
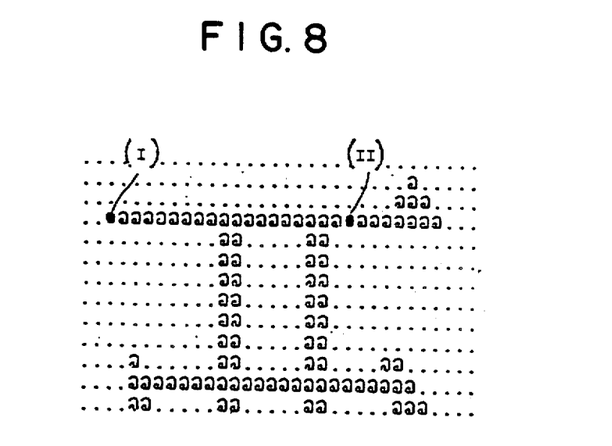
FIGS. 8 and 16 are original dot patterns for explaining the present invention.
Figure 9:
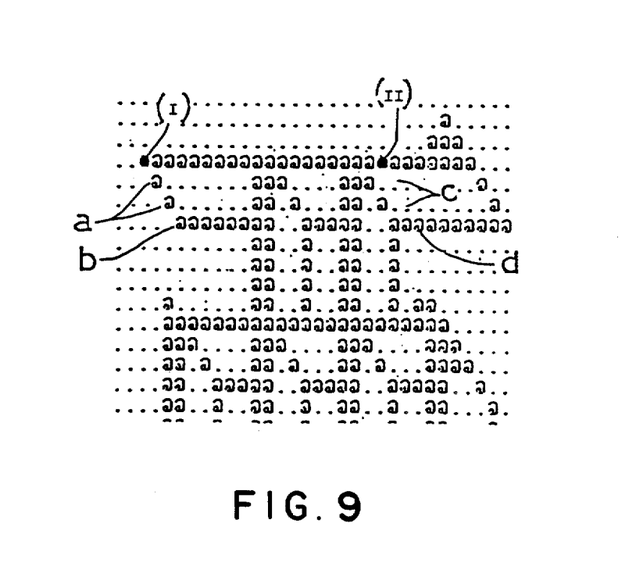
FIGS. 9 and 17 are stereoscopically decorated character dot patterns achieved by the present invention.
Figure 10:
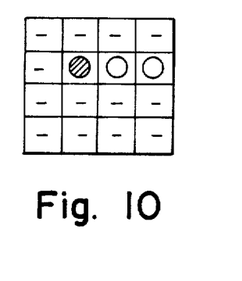
FIG. 10 is a dot pattern read in the shift register of the circumferential information reading device.

FIG. 8 shows a part of a 32×32 dot pattern for "字", a Chinese character. Assuming the dot (I) of the character pattern is subjected to decorative process, the circumferential information reading device 13 reads the dot state around the dot (I). The dot pattern corresponding to the data input to the shift registers 132 is shown in FIG. 10 in which the bits for A, B, F and G are "0" indicating no dot at the positions corresponding to the bits while the bits for C, D and E are "1" indicating that there are dots at the corresponding positions. In FIG. 10, the shaded circle corresponds to the dot (I) in FIG. 8 or the bit "C" of the shift registers 132, and the white circles respectively correspond to the two dots to the right of the dot (I) in FIG. 8 of the bits "D" and "E" of the shift registers 132. The information on the circumference of the dot (I) is transmitted to the decorator 14. The decorator 14 first positions the dot (I) in the decorative character pattern memory 15. The dot (I) is written in the shaded circle position in the decorative character pattern memory 15 as shown in FIG. 11.

Figure 11:
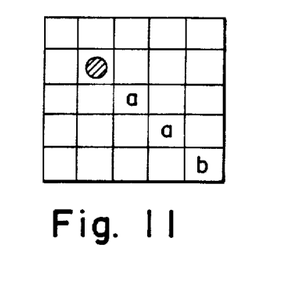
FIG. 11 shows the content of a decorative character pattern memory.
Figure 12:
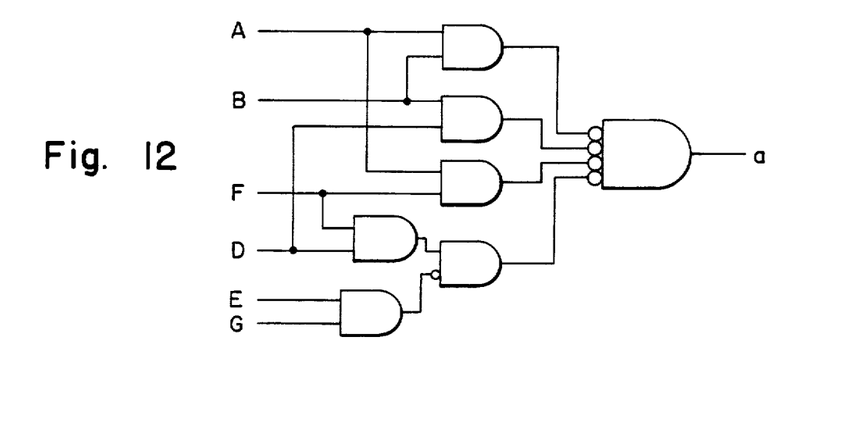
FIGS. 12 and 14 are logic circuits of a decorator 14.
Figure 13:
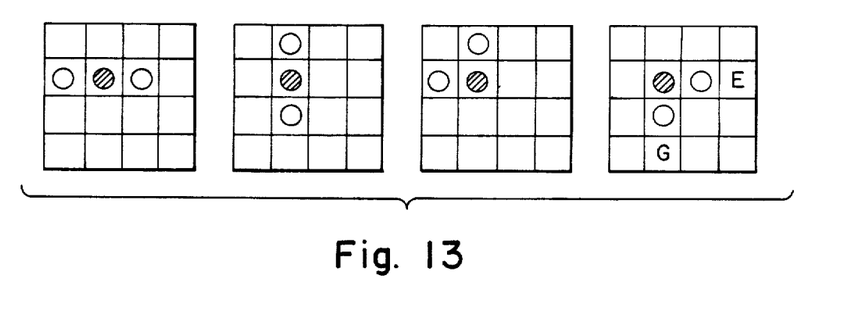
FIGS. 13 and 15 respectively show patterns in the decorator of an embodiment of the present invention.

The decorater 14 then forms dots at the intermediate points "a" and the end point "b" for the stereoscopic side of the character pattern as shown in FIG. 11, based on the circumferential information input. FIG. 12 shows a logic circuit for forming dots at the intermediate points "a" for the stereoscopic side. The inputs "A", "B", "F", "D", "E" and "G" respectively correspond to the states of the bits "A", "B", "F", "D", "E" and "G" of the shift registers 132. FIG. 13 snows four patterns where the logic circuit outputs "0" for "a". These four patterns illustrate possible dot positions except for the dot positions at the bits "E" and "G" of the shift registers 132. Since any one of the four patterns of FIG. 13 does not coincide with the dot pattern of FIG. 10, the logic circuit of FIG. 12 outputs "1" for "a", so that two dots are written diagonally to the lower right of the dot (I) by the predetermined procedure, thus constituting the intermediate points "a" in the decorative character pattern memory 15 as shown in FIG. 11. As a result, two dots "a" are developed for the stereoscopic side intermediate points of the stereoscopic character pattern shown in FIG. 9.

Figure 14:
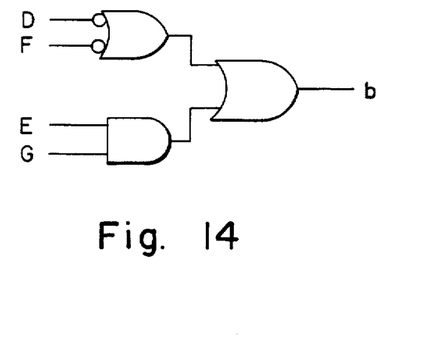
Figure 15:
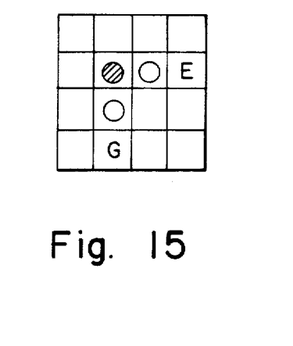

FIG. 14 snows a logic circuit for the decorator 14 to form a dot at the end point "b" of the stereoscopic side. The inputs "D", "F", "E" and "G" respectively correspond to the states of the bits "D", "F", "E" and "G" of the shift registers 132. FIG. 15 shows a dot pattern where the logic circuit outputs "0" for "b". The pattern illustrates a possible dot position except for the dot positions at the bits "E" and "G" of the shift registers 132. Since the dot pattern of FIG. 10 does not coincide with the pattern of FIG. 15, the logic circuit of FIG. 14 outputs "1" for "b". so that a dot is written for the stereoscopic side end point "b" in the decorative character pattern memory 15 by the predetermined procedure, following the dot (I) and the stereoscopic side intermediate points "a". Through this process, a dot "b" is developed for the stereoscopic side end point of the stereoscopic character pattern of FIG. 9.

The same procedure is repeated for each dot following the dot (I) of the original dot pattern. Specifically, stereoscopic side intermediate dots and end dot are formed on the basis of the circumferential dot information around each concerned dot of the original dot pattern. For the dot (II) of the original dot pattern of FIG. 8, dots are not formed at the stereoscopic side intermediate points "c" but a dot formed at the stereoscopic side end point "d", as shown in FIG. 9.

Figure 16:
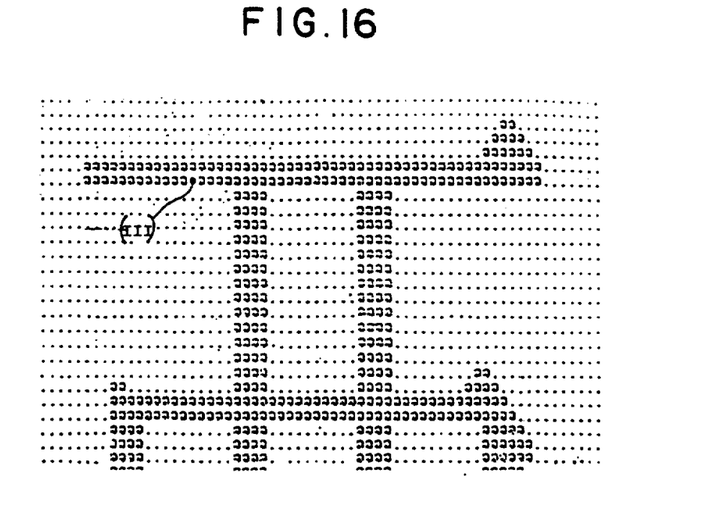
Figure 17:
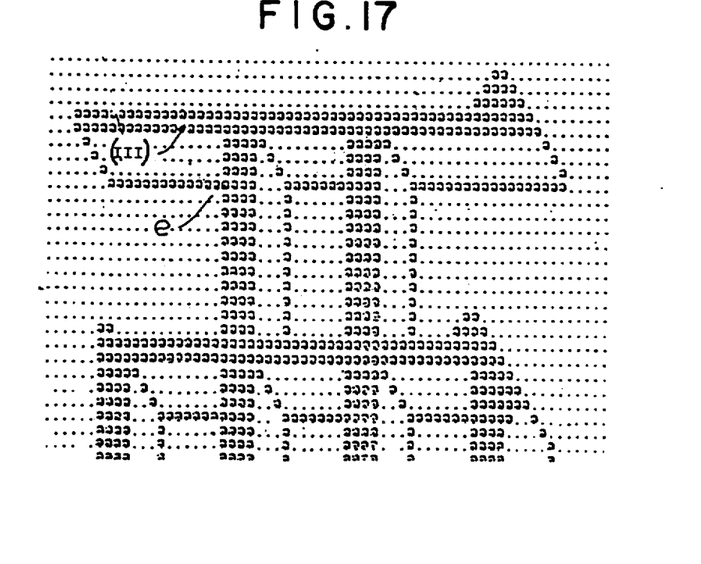
Figure 18:
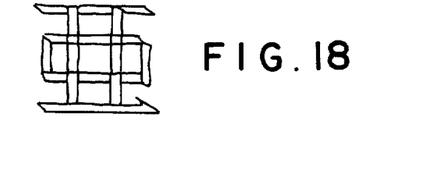
FIG. 18 shows a decorative character printed out by the printer of the present invention.

FIG. 16 shows a part of a 64×64 dot pattern of the Chinese character "字", and FIG. 17 shows a character pattern generated by stereoscopically decorating the dot pattern of FIG. 16. As shown in FIG. 17, a decorative dot "e" is formed for the dot (III) by the same procedure as above. (In this case, however, one more dot or total of three dots are required for each stereoscopic side formation, compared with two dots for the previous case.) Thus, according to the present invention, it is possible to develop a decorative character pattern, irrespective of the original dot pattern size in principle. A printout example of a stereoscopically decorated character of "字" is shown in FIG. 18.

In addition, since decoration is carried out by dots, stereoscopically decorated character scan be successively printed out by sequentially decorating parts of each character and transmitting the data to the printer as the parts of each character are printed out sequentially.

Stereoscopic decoration of characters has been described in the above. It should be noted that various other decorations are possible by modifying the logic of the decorator 14.

According to the present invention, as mentioned above, since each character is decorated by dots on the basis of the circumferential condition of each concerned dot, it is possible to decorate a character of dot matrix pattern, thereby increasing the process speed compared to the decoration of a vector-based character. Furthermore, since each character is printed out sequentially by dots, only a part of the entire character may be decorated at one time and transmitted to the printer. This permits a smaller buffer capacity and parallel operation of decoration with printing as well, thus enhancing the process efficiency. In addition, various decorations are achieved irrespective of the original pattern size simply by adding or modifying the logic.

According to the present invention, as understood from the above, word data can be printed out with different kinds of decorative characters for different lines. Decorative character font-identifying data is input and stored by bits, facilitating adaptation of the present invention to more diversified decorative character fonts. In addition, the same operation can be used for designating any of various decorative character fonts, and the designated decorative character font can be changed easily by a format setting operation. Furthermore, the same control code as quadruple character code is used in identifying decorative character font. Since decorative characters thus developed are of quadruple size, they are quite useful for titles or headings.

In the above embodiment, print out format can be set for each line of the word data and decorative characters can be printed out only in the quadruple character mode. Alternatively, the invention may be modified to permit the print out format to be set for each word, and decorative characters to be printed out in other sizes than quadruple size. It is also possible to modify the invention so that word data is printed out with different decorative character fonts for different words (this can be achieved by the same process as for printing out the data with different decorative character fonts for different lines).

While only certain embodiments of the present invention have been described, it will be apparent to those skilled in the art that various changes and modifications may be made therein without departing from the spirit and scope of the present invention as claimed.

What is claimed is:

1. A word processor for editing and printing out word data in a document in a prescribed format according to format data, comprising:

means for selecting one of format data input mode and word data input mode;

means for inputting word data in response to word data input mode being selected by said selection means, said word data being input to form lines, each line having a head and tail, said means for inputting also inputting format data in response to the selection of the format data input mode, said format data controlling said word data;

means for storing the inputted format data and word data;

means for determining whether said word data stored in said means for storing includes decorative character-related data, said decorative character-related data being at one of the head and tail of a line of word data; and means for developing decorative characters from the word data in said line of word data when said determination means determines that the format data which controls the word in said line of word data has decorative data, an amount of word data being controlled by said format data being smaller than or equal to said line of word data, and when said word processor prints out the word data stored in said means for storing and said means for determining determines that the head or tail of a line of word data includes said decorative character-related data, said means for developing causes said word processor to print out said line of word data in a changed format from word data without decorative character-related data at the head or tail of the line thereof, said line of word data being printed out according to said decorative data in said which controls said line of word data format data in at least one of stereoscopically decorated black characters, stereoscopically decorated white characters, white decorative characters and thick decorative characters, whereby lines of said document can be in different formats while said document is continuously printed out by said word processor.

2. The word processor as recited in claim 1, further comprising control means coupled to said line of word data for determining which part of the word data is controlled by said format data, said means for developing being responsive to said control means in developing the decorative characters.

3. The word processor as recited in claim 1, further comprising means for displaying at least a portion of said document to be printed, said means for displaying further displaying paper size, number of characters on a line, line feed pitch, character size and decorative character font.

* * * * *